United States Patent [19]

McGee

[11] Patent Number: 4,793,087
[45] Date of Patent: Dec. 27, 1988

[54] FISHING ROD HANDLE ADAPTED FOR BAIT CASTING

[76] Inventor: Gary L. McGee, Rte. 1, Box 669, Lucedale, Miss. 39503

[21] Appl. No.: 44,141

[22] Filed: Apr. 30, 1987

[51] Int. Cl.$^4$ .............................................. A01K 87/00
[52] U.S. Cl. ............................................ 43/23; 43/22
[58] Field of Search ........................................ 43/23, 22

[56] References Cited

U.S. PATENT DOCUMENTS

| D. 165,529 | 12/1951 | Kittermann | 43/23 X |
| 2,283,816 | 5/1942 | Loutrel | 43/23 |
| 2,293,559 | 8/1942 | Patterson | 43/23 |
| 3,744,173 | 7/1973 | Puyear | 43/23 |

Primary Examiner—M. Jordan
Assistant Examiner—Carmine Cuda
Attorney, Agent, or Firm—Alexander F. Norcross

[57] ABSTRACT

A bait casting handle is shown having a portion adapted to be grasped by the middle ring and little fingers, enclosing into the palm which is canted at a fifteen degree angle to the line of the bait casting rod, and further, having, in line with the line of the first three fingers, an essentially enclosing finger hole adapted to receive the index finger, positioned so as to hold the same in a slightly open pistol grip position, the line of the first digit of the index finger being substantially parallel to the alignment of the rod.

1 Claim, 1 Drawing Sheet

FISHING ROD HANDLE ADAPTED FOR BAIT CASTING

BACKGROUND OF THE INVENTION

Fishing rods, as a device for casting and controlling the casting of a bait or lure attached to a retrieval line and adapted for the catching of fish, have been known since before Isaac Walton's famous first treatise on fly fishing. A fishing rod serves two major purposes:

As a spring-loaded lever having a very large speed ratio, it serves to impart a controlled tension and force to a fishing line, directing and transforming a snapping action of the hand into a whip action of the fishing line, casting a lure in a controlled manner both as to direction and, in the hands of skilled user, as to distance.

As an essentially large spring, when held substantially at right angles to the direction of tension on a fishing line while a fish is being engaged, the rod maintains, through spring-like lever action, a constant, non-jarring tension on the line and, thus, allows a substantially lightweight line to be effectively used to wear down and catch a fish which should be capable of imparting a breaking tension on the line.

Any feasible means of securing the rod would probably be suitable for the second, catching purpose. The major emphasis in rod design and in the design of handles is on providing precise, tactile feedback to aid in the very delicate process of repeatably and accurately casting a lure to a given spot using the rod. In this regard it is to be noted that the mechanical advantage of a standard six foot fishing rod, from point of pivot to outer tip is a extreme.

The average male human hand may span four inches when in a handle gripping position, from the point of pivotal rotation to the edge of the extended index finger; on a six foot fishing rod this represents an eighteen to one mechanical ratio between the motion of the tip and the motion of the hand. More importantly, the speed of manipulation of the rod, the angular momentum imparted to the handle of the rod, is a complex combination of forces. A change in angular acceleration, as by a whipping motion, is partially stored in the spring action of the rod; there is a delayed application in the motion imparted to the dynamic combination of line and lure. This spring action is a function of rod stiffness, and for the typical tapered fishing rod, is additionally a function of the varying spring rate along the length of the rod. The motion itself, that of casting, is typically of only several seconds duration; further, although human sight is the most precise of the senses, during most of the cast it is not possible for the fisherman to visually follow the motion of the entire system.

For this reason, tactile feedback becomes the principal, predominate mechanism whereby the fisherman may detect and control the speed of his cast, the energy that is held in the rod as spring-bending rather than as motion, and the movement of the rod.

However, this feedback necessarily must be extremely precise as the very same lever action which translates a relatively small wrist motion into a major increase in velocity of the lure equally reduces the feedback forces from the dynamic combination of lure, line, and rod to very small sensations of motion and pressure. Again, for a six foot rod the tactile sensations on the hand of the fisherman are reduced by the same eighteen to one ratio that the force of the user's wrist is magnified by.

For this reason, it is important in a casting rod that the fisherman be able to repeatably and accurately feel the motions and actions of the rod, the line, and the lure.

An additional factor occurs in the field of bait casting. Bait casting tends to use substantially thicker and, therefore, less flexible line than fly casting or spin casting and tends to use shorter, stiffer rods with heavier lures. The most important hand manipulation difference, results from the fact that in bait casting, the typical bait casting reel has a significant angular moment of inertia on the line and spool. The dynamics of spool operation, therefore, differ considerably from fly casting; spin casting reels were initially invented to overcome the spool inertia effect typical in bait casting. It is this spool inertia that creates overrunning and backlash should, at any time during the casting process, the rod be manipulated so that the speed with which the line feeds out ever decrease. Such a decrease results in the reel overrunning the line and jamming with a backlash.

In order to prevent this effect typical bait casters hold a fishing rod so that their thumb remains adjacent to the reel, so that thumb contact can be applied for reel control or as form of drag during casting.

Removing the thumb from an enclosing position around the rod handle changes the feel of the rod within the hand, and makes the relative tactile feedback through the fingers more important to successful casting.

SUMMARY OF THE INVENTION

The invention discloses a construction for a bait casting rod handle which provides a more accurate and sensitive tactile feedback to the hand of the user and permits more precise control of bait casting, especially for casts other than straight overhead casts, or where the relative motion of the hand becomes unusual. Such casts include underhand casts to clear overhanging trees and obstructions and lateral casts for directional control.

The handle comprises a hand grip portion adapted for enclosing gripping between the base of the palm of the hand and the middle through little fingers. This grip defines a line of handle axis essentially through the cylinder formed by curling the middle through index fingers around the palm. This handle axis is canted at approximately a fifteen degree angle to the axis of the fishing rod. Forward of the position of the middle finger, but located along the line of the fingers of the hand is an enclosing index finger hole. This index finger hole is beveled around its rear circumference to match an approximately forty-five to sixty degree angle of the second joint segment of the index finger as it is naturally positioned to engage the rod handle. The forward part of the index finger hole is not beveled but is substantially straight so as to provide tactile contact around the circumference of the index finger.

The symmetric bevel at the rear of the hole permits the handle to be used both in a left and a right handed pattern for casting interchangeably left and right handed.

The resulting handle encloses the index finger in a natural position for bait casting, and cants the handle so that the line of the rod rises at approximately a thirty degree angle with respect to a line drawn through the forearm and straightened wrist of the fisherman.

It is found that this combination of angular offset and enclosing tactile contact with the index finger of the user permits a heightened sensation of control and a much more accurate casting motion to be made than is the case of prior art rods which provide only for a trigger effect for use by the index finger.

It is found that this effect is especially important for back casting and under casting where the force on the index finger is in a forward and upward direction, rather than in a down direction against a trigger guard as is typical in overhand casting.

It is thus an object of this invention to provide a bait casting handle of a design permitting a significantly increased tactile feedback and control of the casting process to the user.

It is a further object of this invention to provide a bait casting handle which provides a more precise control of a bait casting rod during the casting process.

It is a further object of this invention to provide an improved fishing rod handle providing for enhanced control of rod motion and line motion by the fisherman.

DETAILED DESCRIPTION OF THE PREFERRED EMBODIMENT

Figure 1:
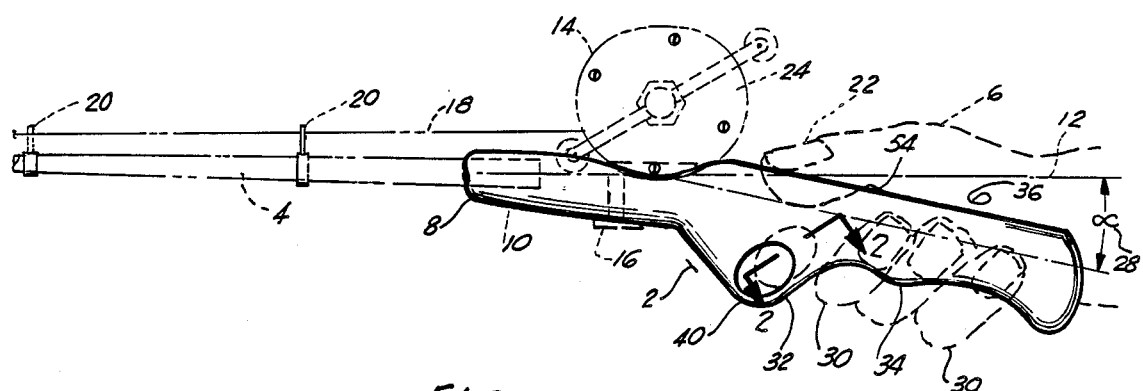
FIG. 1 is a side view of the inventive handle, in operative use.

The fishing handle 2 of the invention, shown in side view in FIG. 1, is a single monolithic construct, which serves, as described above, as both the means by which the fishing rod 4 may be grasped and controlled by the hand 6 and as the principal means for tactile feedback to the hand 6 for manipulation of the fishing rod 4.

In the preferred version of the invention, the handle 2 is constructed by carving, of a single piece of hard wood, preferably of oak, hickory, or ash. The soft woods, such as pine, have been found not to provide the same tactile feedback to the hands and, therefore, are considered less satisfactory; some woods have the additional disadvantage of being brittle and susceptible to cracking under use, and are also not desirable.

The handle 2 is constructed, as stated above, by being made, preferably from hard woods, as a single unitary construction having a nose piece 8 within which is bored a rod receiving receptacle 10. This receptacle must be a high tolerance, well bored hole, providing a tight frictional fit to the fishing rod; the line of the receptacle 10 establishes the overall line of position 12 of the fishing rod 4.

The handle 2 extends to the rear of the fishing rod 4 from the nose piece for a distance at which is found a bait casting reel 14 mounted at a bait casting reel mount 16 of a design well understood in the art. Fishing line 18 extends forward from casting reel 14 through line guides 20, which are mounted at periodic intervals along the length of rod 4.

It is known in the art of bait casting that the hand grip provided to the user must be such that the thumb 22 of the hand be positioned so that it may readily be placed against the line spool 24, not shown in the figures but well understood as to its position. This, therefore, establishes the relative position of the hand with respect to the position of the reel 14 and, therefore, with respect to the location of the reel mount 16 on handle 2.

The handle 2 of the invention is then extended at an angle 28, provided with a grip for the middle, ring and little fingers 30 of the hand. The overall angle 28 is established such that, when the hand is curved in a natural grasping motion, the lower edge 34 of the handle being grasped approximately with the second joint segment of the fingers 30, the handle 2 remaining in a grasped position within the palm 36 of the hand, that when the wrist of the hand is held in an essentially straight position with the forearm extended on substantially a horizontal line, the overall fishing rod 4 extends at approximately a twenty to thirty degree angle above the horizon. It is found that this angle provides a substantially improved control over the manipulation of the rod, by maintaining the tip of the rod in a slightly elevated position when the arm is in a relaxed state. For the average fisherman, angle 28 is found to be approximately fifteen degrees.

The overall position of the handle 2 and the fishing rod 4 thus being established by the angle 28 at which the hand grip portion 38 descends with respect to the nose piece 8, a position for the index finger 32 is thus defined by a continuation of the normal line of position of the gripping fingers 30. Provided within the handle, smoothly carved therein, is an enclosing index finger loop 40. This loop is carved so that, with the index finger first joint segment 42 extending into the loop and the second joint segment 44 of the index finger, at an angle to the side of the loop 40, the overall loop is in touching contact with the outer periphery of the index finger, touching the front 48 and extending around the periphery of the finger including the rear 50 of the finger.

Figure 2:
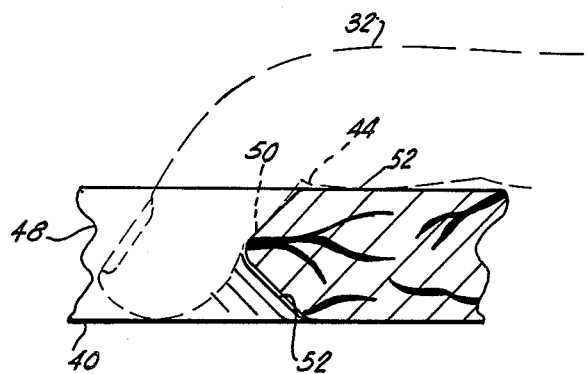
FIG. 2 is a sectional view through the finger grip of the handle showing the inter-relationship of finger and handle.
Figure 3:
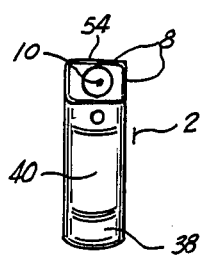
FIG. 3 is a front view of the handle, with rod removed.
Figure 4:
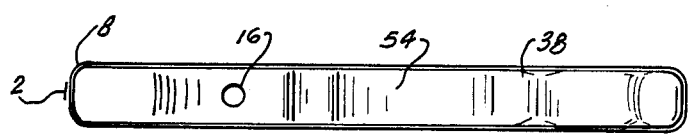
FIG. 4 is a top view of the handle.

The rear section of the index finger enclosure 40 is provided with symmetrical bevels 52 which are adapted so that in a natural position, handle 2 being grasped by the hand 26, the second joint segment 44 of the index finger is at substantially a forty-five to sixty degree angle to the direction of the rod 4. The slope of the finger shown in FIG. 2 is to that extent exaggerated to show the grasping effect of which the finger is capable, and the more relaxed position shown in FIG. 1 is more typical. In practical use the effect of the side bevels 52 is that the third joint segment of the index finger is essentially extended along a line extending forward from the arm through the wrist and the hand, providing a pointing effect to the index finger. The side bevels 52 are symmetrical so as to adapt the handle 2 to ready use by both left handed or right handed casters.

In use, the fishing handle 2 is grasped, as stated above in the description of the structure, with the three fingers 30 of the hand curling around the hand grip 38, holding it within the curled section of the palm of the hand 6; the thumb 22 rests along the top 54 adjacent the location of the reel 14. The index finger 32 then naturally fits into and is enclosed within finger enclosure 40, the shape of the side bevels 52 being such that in relaxed form the index finger extends along a substantially straight line defined by the position of the arm, being curved so that the first joint segment 42 is contactingly enclosed within enclosure 40, the second joint segment 44 being at an angle.

It is believed that where the handle is grasped in such a manner, that the innate pointing synapses of the average fisherman, are enhanced, increasing the accuracy of rod motion. It is found that the tactile sensations caused by surrounding the index finger in the position created by the enclosure 40 are such that movement and preciseness of cast and control are significantly enhanced.

This preciseness of control is particularly enhanced in back casting where the cast occurs from the rod tip being lowered and to the side and then whipped in a reverse upward direction, a technique commonly used to clear low or overhanging obstacles such as tree limbs. Such a motion imparts a forward motion to the hand and to the grasping finger; this forward motion readily converts into touch on to the front of the finger 48, and through tactile feedback, permits the user to better feel the motion of the rod, and the resistance of the line and lure, sensations absent in the handles of the prior art.

It is found that when the handle is made of essentially hard woods, that minute vibrations transmitted through the rod by the motion of lure and line are readily transmitted to the skin of the hand 6 and are readily felt; padded handles, or handles made of a more resilient or a softer material, seem to dampen these minute sensations and the result is a noticeable difference in the feel of the handle 2 and rod 4 when the handle is made of such materials.

By providing, during all points of cast and retrieval, consistent skin contact to the periphery of the index finger, advantage is taken of feedback to the pointing reflex of the user, and the overall feel of the rod is significantly enhanced. The user is able to cast in all positions more accurately and with more positive control over the rod and the line. This enhanced sensation in control is also available during capture and retrieval of a fish. The overall handle 2 of the current invention is perceived by the user to provide a significantly improved controllability of the fishing rod during bait casting operations.

It should thus be apparent that the invention extends, beyond the specific embodiment above shown as illustrative of the invention and rather includes that wider class of embodiments claimed below.

I claim:
1. A handle, adapted to the manipulation of a fishing rod comprising:
   a. a nose piece adapted to rigidly, removably affix to an end of a fishing rod, defining a front end of said handle;
   b. said fishing rod and said nose piece defining a first line of position of said handle;
   c. means adjacent a midsection of said handle, adapted to receiving in operating engagement thereto reel means for the dispensing and retrieval of a fishing line, said midsection being affixed intermediate said nose piece and a hand grip means;
   d. said hand grip means affixed to said midsection of said handle, defining an end of said handle away from said nose piece, said hand grip means further comprising;
      i. an extended, angled section, substantially rectangular in cross-section, adapted to being grasped by the three smaller fingers of the hand in conjunction with the palm thereof;
      ii. said extended, angled section extending at an angle substantially equal to fifteen degrees from said first line of position; and
      iii. finger tactile feedback means attached to said hand grip means intermediate said extended, angled section and said midsection, said feedback means further comprising an aperture having:
         a. a symmetrical beveled rear section adapted to support the second joint segment of the index finger at between forty five and a sixty degree angle to said first line of position;
         b. an enclosing circumferential section in touching contact with at least the back of the index finger.

* * * * *